Oct. 29, 1946.   C. A. FRISCHE ET AL   2,410,058
AUTOMATIC CLIMB AND GLIDE CONTROL FOR AIRCRAFT
Filed April 25, 1939   3 Sheets-Sheet 2
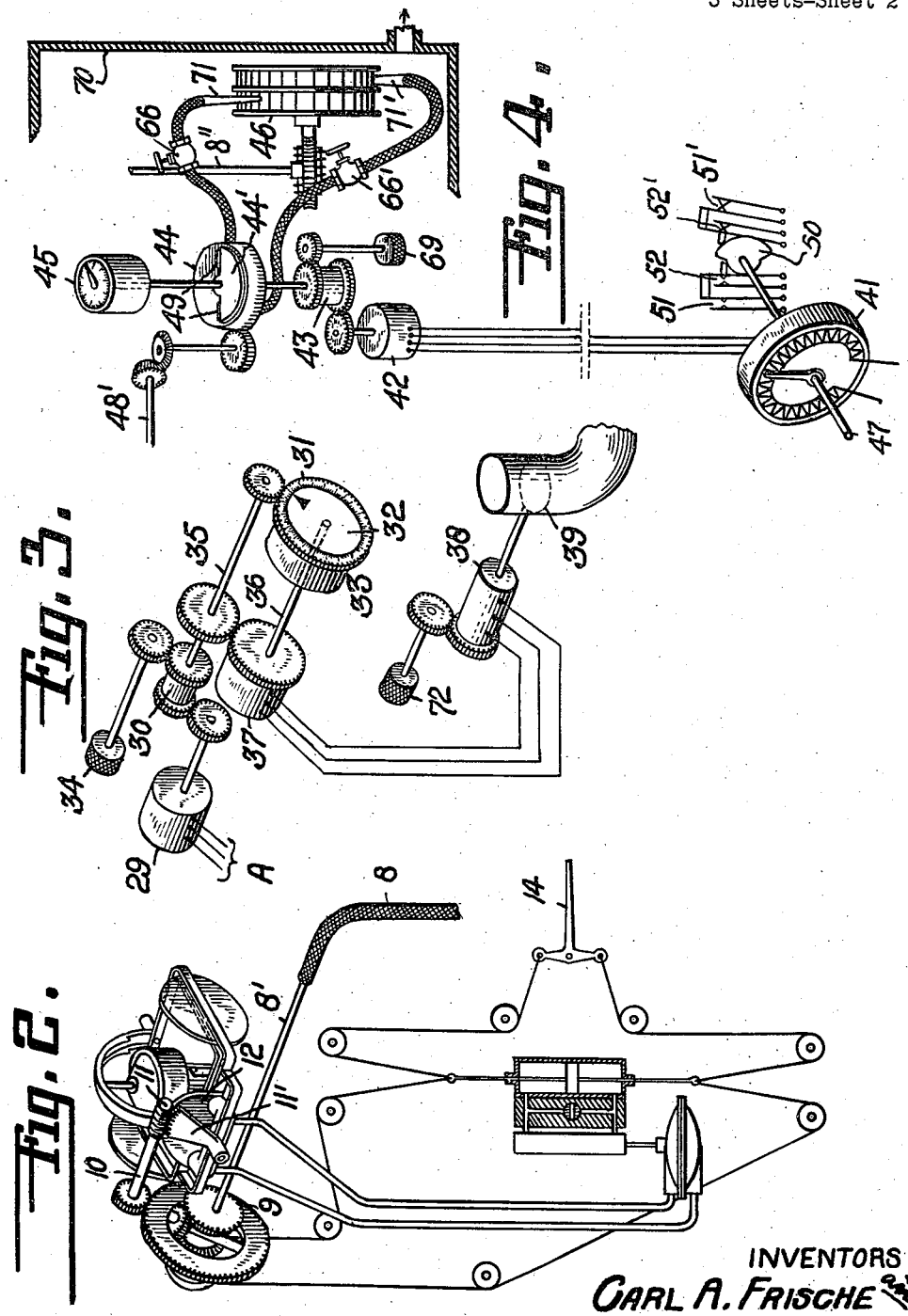
INVENTORS
CARL A. FRISCHE
GERALD N. HANSON
BY
Herbert F. Thompson
THEIR ATTORNEY Oct. 29, 1946.  C. A. FRISCHE ET AL  2,410,058
AUTOMATIC CLIMB AND GLIDE CONTROL FOR AIRCRAFT
Filed April 25, 1939  3 Sheets-Sheet 3
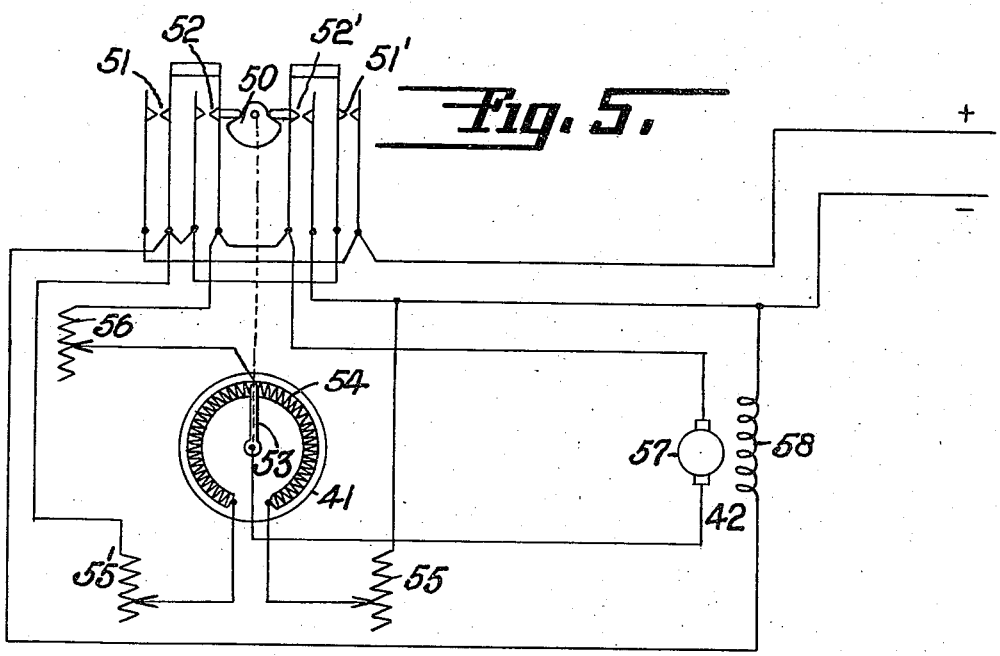
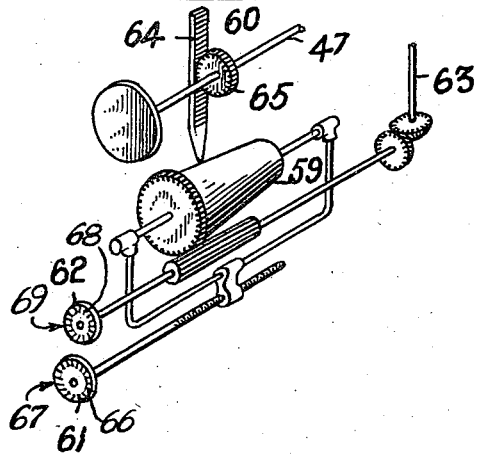
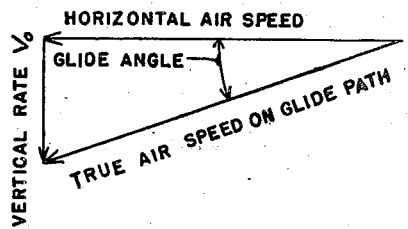
INVENTORS
CARL A. FRISCHE
GERALD N. HANSON
BY
THEIR ATTORNEY Patented Oct. 29, 1946

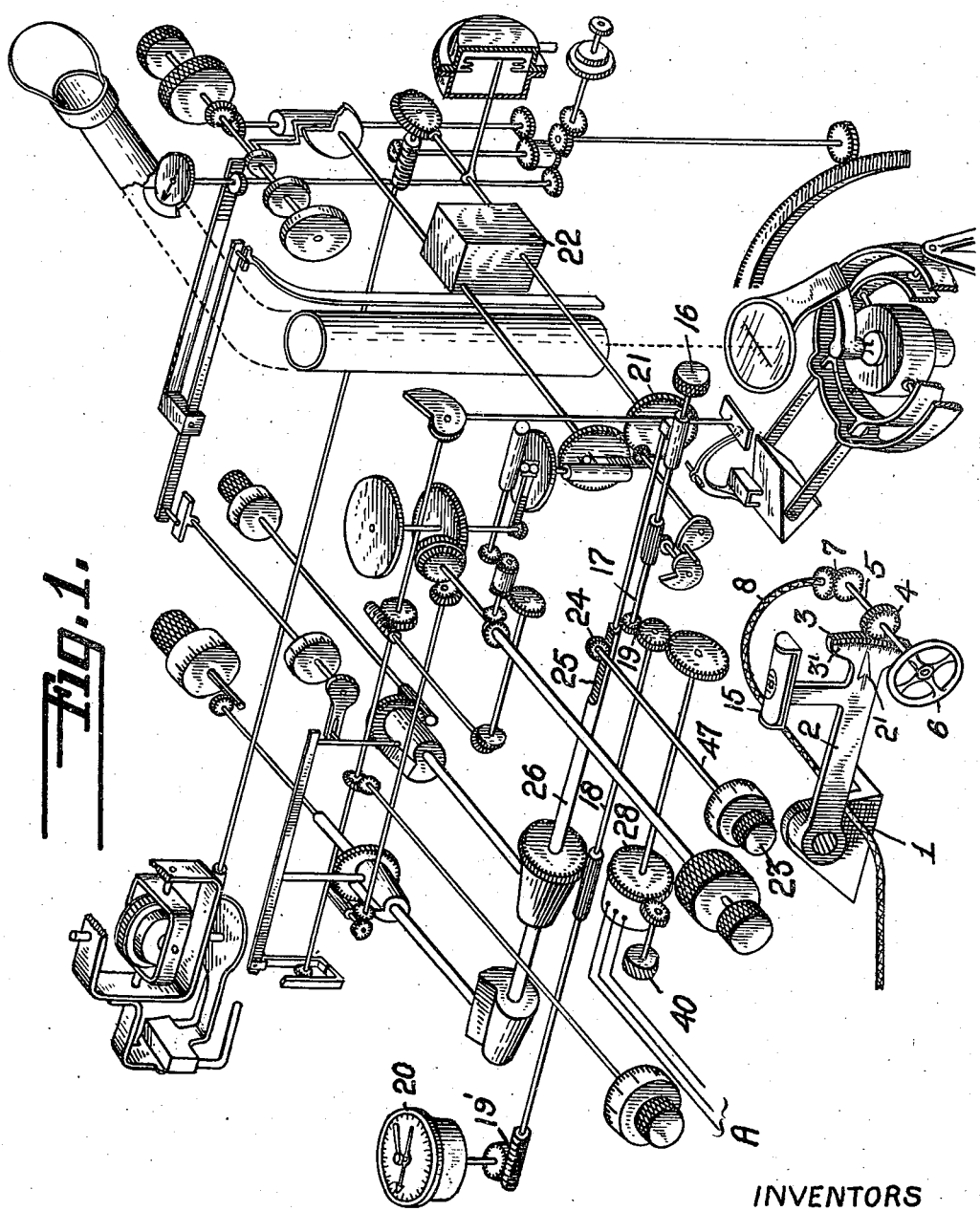

2,410,058

UNITED STATES PATENT OFFICE 2,410,058

AUTOMATIC CLIMB AND GLIDE CONTROL FOR AIRCRAFT

Carl A. Frische, Leonia, and Gerald N. Hanson, Allendale, N. J., assignors to Sperry Gyroscope Company, Inc., Brooklyn, N. Y., a corporation of New York Application April 25, 1939, Serial No. 269,838

12 Claims. (Cl. 244—76)

This invention relates to automatic pilots for aircraft and, more particularly, to an automatic pilot designed for use with or operation from a bomb sight. Many features of our invention, however, have application to automatic pilots in general and the invention is therefore not limited to bomb sights.

Heretofore, aircraft carrying sighting and computing mechanisms such as are incorporated in a bomb sight, have been controlled entirely from the pilot's position in the same manner as aircraft for other services. This control has been exerted by the human pilot either directly or through an automatic pilot whose settings he controlled. Since a bomb sight is usually located at a point more or less remote from the pilot's position, it has been necessary to interchange information between the two positions when turning or gliding to permit the sight operator to give directions to the pilot and to correlate the settings of the sight with actual flight conditions.

In our copending application Serial No. 206,984, we have disclosed a method for controlling the banking of an aircraft from a position remote from the pilot's position, which makes it possible to execute a correct turning maneuver from the remote position without the aid of the pilot.

Our present invention is directed chiefly toward providing climb and glide control from a remote position and introducing certain compensating corrections into the computing mechanism of a bomb sight. In addition to the bomb sight corrections, however, other adjustments must be made during departure from level flight, among which is a change of the power and speed of the craft's engine or engines to maintain a constant air speed. This is accomplished by varying the throttle opening in the engine intake manifold, a greater throttle opening being required during a climb and a lesser opening during a glide than is required for level flight.

Another necessary adjustment is that of the air speed meter indication. The reading of the usual type instrument of this class must be corrected for air density, and hence compensation must be applied during a climb or glide to offset the effect of change of density with change of altitude. Heretofore these tedious adjustments have had to be made manually by the pilot. In our invention we effect the required adjustments automatically in accordance with the angle of climb or glide, which is set at the bomb sight or other remote position.

This invention is concerned primarily with continuously introducing an altitude correction into a bombsight. In accomplishing this purpose, provision has also been made for automatically controlling the gliding and climbing movements of the aircraft.

Although these automatic climbing and gliding controls are described herein, claims to the aircraft control features per se, as distinguished from the bombsight control including these features, are contained in our copending application, Serial No. 429,754, for Altitude control for aircraft, filed February 6, 1942, which is a continuation-in-part hereof.

One object of our invention is to provide control means at a position distant from the pilot's or normal control position for introducing an altitude correction into a bombsight and for causing the airplane, through the automatic pilot, to climb or glide at any angle consistent with stable flight.

Another object is to provide means for applying to a bomb sight computing mechanism a continuous correction for change of altitude during a climb or glide.

Still another object is to provide means for introducing an altitude correction into a bombsight and an automatic throttle control for maintaining a constant air speed during non-level flight.

A further object of our invention is to provide means for introducing an altitude correction into a bombsight and for continuously correcting the indicated air speed for change of altitude during a climb or glide.

Other objects and advantages of this invention will become apparent as the description proceeds.

We have illustrated our invention as applied to the type of bomb sight disclosed in the prior application of E. W. Chafee and H. C. VanAuken, Serial No. 128,034, filed February 26, 1937.

Fig. 1 is a diagrammatic drawing in perspective of a part of the mechanism of our invention associated with the sighting and computing mechanism of a bomb sight.

Fig. 2 is a diagrammatic drawing, partly in perspective and partly in section, illustrating the application of our invention to an automatic pilot for controlling the flight of an aircraft.

Fig 3 is a diagrammatic drawing in perspective of a preferred arrangement for controlling the speed of an aircraft in accordance with our invention.

Fig. 4 is a diagrammatic drawing in perspective of preferred means for causing an aircraft to climb or glide and simultaneously effecting the necessary corrections incident to change of altitude.

Fig. 5 is a wiring diagram of the electrical apparatus of Fig. 4.

Fig. 6 illustrates one form of a mechanism for computing the rate of change of the vertical component of climb or glide.

Fig. 7 is a diagram illustrating the method of computing vertical rate of change of altitude.

In certain forms which our invention may take, we provide independently controlled means for causing the aircraft to climb or glide and for effecting the altitude corrections necessitated thereby, while in other forms we prefer to provide jointly controlled means, as will be apparent from the drawings and the following description.

1 represents the housing of a bomb sight on which an arm 2 is pivoted, said arm bearing a gear segment 3 engaging pinion 4 on shaft 5. A handwheel 6 is provided for rotating shaft 5 and thereby tilting arm 2 at any angle with the horizontal, readable on scale 3' by index 2', at which it is desired to cause the craft to climb or glide. The rotation of shaft 5 is transmitted through a pair of bevel gears 7 to a flexible shaft 8 connecting with the automatic pilot, which is illustrated as of the type disclosed in U. S. Patent #1,992,970, dated March 5, 1935, E. A. Sperry, Jr., B. G. Carlson and M. F. Bates, inventors. At the bank and climb unit 13 of the automatic pilot, flexible shaft 8 terminates in rigid shaft 8' (Fig. 2) which is connected to one arm of a mechanical differential 9, the housing of which rotates shaft 10, carrying worm 11 which engages worm wheel sector 11'. On the same shaft and rotating with sector 11' is the cut-off plate 12 of the air pick-off on the climb axis of the bank and climb gyro. The type of pick-off shown is well known in the art and its operation is described in above mentioned Patent #1,992,970. The rotation of cut-off plate 12, acting through the servo system of the automatic pilot, causes elevator surface 14 to be rotated, thereby causing the aircraft to depart from level flight. The motion of elevator 14 is transmitted to a second arm of differential 9 and through said differential back to cut-off plate 12, causing the cut-off plate to be rotated in the opposite direction to that in which it was originally rotated by shaft 8', and, when the rotation of elevator 14 is completed, returning said cut-off plate to its neutral position in which it equally obstructs the air ports of the pick-off. A level 15 on arm 2 serves to indicate whether or not the climb or glide angle of the craft agrees with setting of said arm, zero reading indicating perfect agreement.

By the above described means the operator of the bomb sight is enabled to cause the craft to climb or glide at any desired angle. From the angle and the known air speed, the vertical component of the rate of climb or glide may easily be computed. The bomb sight disclosed in above mentioned application, Serial No. 128,034, is adapted to receive this vertical rate $V_0$ and automatically correct the line of sight and make the computations incident to changing altitude. According to our invention, we provide means for altering other quantities, such as indicated air speed and throttle setting, simultaneously with the introduction of the rate $V_0$ into the bomb sight.

The angular position of shaft 17 in the bomb sight is proportional to altitude. This shaft carries at one extremity a knob 16 by means of which manual settings of altitude can be made. The position of shaft 17 is indicated in terms of altitude by altitude meter 20, the pointer of which is driven from shaft 17 through gears 19, shaft 18 and gears 19'. Change of altitude, as represented by rotation of shafts 17 and 18, rotates various computing cams which introduce altitude into the computations of the sight. Since it is inconvenient and difficult to set in a constant rate of change of altitude during a climb or glide by manual rotation of knob 16, the bomb sight includes a variable speed drive 21 of the disc-ball-roller type driven by a constant speed motor 22 which allows a rate of change of altitude to be set in as a displacement of the ball carriage. This displacement is produced by the rotation of a "$V_0$ rate" knob 23 on shaft 47, which is transmitted to the ball carriage by pinion 24 and rack 25 on push rod 26. The displacement of the ball carriage from its central position causes the roller of the variable speed drive to drive shaft 17 in a direction and at a speed proportional to the setting of knob 23.

In our invention we drive from shaft 18, through gearing, a "Selsyn" transmitter 28 which generates an electrical signal proportional to the relative angular displacement of its rotor and housing and therefore, when its housing is stationary, proportional to the rotation of shaft 18. This signal is transmitted over leads A to a suitable self-synchronous receiver 29 (Fig. 3) whose rotor reproduces the angular motion of the transmitter rotor. Through mechanical differential 30, receiver 29 rotates shaft 35 and thereby rotates a pinion meshing with teeth on a rotatable ring 31 carrying a scale and concentric with the index-bearing dial 32 of air speed indicator 33. The operation of this air-speed indicator, which is of a type well known in the art, depends on the relation of static and velocity heads and its uncorrected reading therefore changes with change of air density and hence with altitude. By causing the scale carried by ring 31 to be displaced with respect to the index on dial 32 through an angle which is proportional to altitude, we apply a continuous correction for change of altitude whereby the correct air speed is indicated at all times during a climb or glide as well as during level flight.

The position of ring 31 with respect to its index on dial 32 is independently controlled by knob 40 (Fig. 1) which, through gearing, rotates the housing of transmitter 28, thereby producing a relative displacement of said housing with respect to its rotor and generating an electrical signal which causes receiver 29 to rotate ring 31 as above described. An "Air Speed Spot" knob 40 provides means for manually introducing an initial setting or other fixed adjustment of the indicated air speed. In addition to the two above described means for controlling the position of the scale on ring 31, a further independent adjustment is provided by knob 34 (Fig. 3) located at the instrument board and under the control of the pilot. The rotation of said knob is communicated through differential 30 to shaft 35 and thereby to ring 31.

Connected with the inner dial of air speed meter 33 and rotating therewith is shaft 36 on which is mounted the rotor of "Selsyn" transmitter 37. The signal generated by this transmitter is transmitted to a suitable self-synchronous receiver 38 arranged to position throttle 39 in the intake manifold of the craft's engine. By varying the throttle opening to control the speed of the engine, and thereby the speed of the propellers, we compensate for changing altitude and maintain a constant air speed, which is one of the necessary conditions for correct operation of a bomb sight. To provide for the introduction into the throttle control signals generated by transmitter 37 of the same altitude "spot" correction as is introduced into the air speed indicator signal, the motion of knob 34 is transmitted to the housing of "Selsyn" transmitter 37, thereby displacing this housing with respect to its rotor and proportionally changing the generated signal.

It is to be understood that in the above description where the term "suitable self-synchronous receiver" is used, this means the provision of a receiver having sufficient torque to operate properly the members to which it is connected, and is intended to include a servo mechanism as an adjunct to the usual "Selsyn" receiver where such mechanism is required to perform the desired functions.

By the described means the air speed of the craft is maintained constant and the indicated air speed corrected for change of altitude. At the same time, by the displacement of push rod 26, the necessary corrections are simultaneously and automatically introduced into the computations of the bomb sight.

In a variation of the above form of our invention, we employ electrical means for producing a displacement proportional to rate of change of altitude. For this purpose, as shown in Fig. 4, we provide on "Vo rate" knob shaft 47 an electrical potentiometer 41 to control the speed of a variable speed motor 42 in a manner to be presently described. This motor, through a mechanical differential 43, rotates plate 44 carrying the air ports of a pneumatic control which is similar in construction to the air pick-off from the control gyros of the automatic pilot and, as above noted, is fully described in U. S. Patent No. 1,992,970. The cut-off plate 44' of said pneumatic control is positioned by the sensitive element of altimeter 45. Air is continuously drawn through the two ports 49 in plate 44 and through the connecting supply lines terminating in nozzles 71 and 71' by suction within the housing 70 of the bank and climb unit of the automatic pilot. The rotor 46 of the level flight air turbine of the automatic pilot has two oppositely bladed sections so that the air discharged by nozzle 71 tends to produce rotation in one direction, while that discharged by nozzle 71' tends to produce rotation in the opposite direction. Rotor 46 is geared to shaft 8" which is adapted to connect to one side of mechanical differential 9 in the manner of shaft 8' (Fig. 2) and thereby control the air pick-off on the climb axis of the bank and climb gyro. In level flight the two air ports 49 are equally closed by cut-off plate 44' and the same amount of air is discharged by nozzles 71 and 71'. During a climb or glide, however, plate 44 is slowly rotated in one direction or the other by motor 42, thereby differentially uncovering air ports 49 and producing a differential flow of air from nozzles 71 and 71', causing the rotor of air turbine 46 to be turned in a direction corresponding to the direction of rotation of motor 42 and thereby, through the climb unit of the automatic pilot, causing the craft to climb or glide at a steady rate. As the craft's altitude changes, the sensitive element of altimeter 45 continuously repositions cut-off plate 44' of the aforementioned pneumatic control in a sense which tends to restore the relative positions of 44 and 44' to the balanced condition in which both air ports 49 are equally covered. The mechanism just described therefore operates as a follow-up system in which the sensitive element of altimeter 45 performs the repeat-back function. Valves 66 and 66' are provided to shut off the flow of air to nozzles 71 and 71', respectively, when altitude control by means of motor 42 is not desired.

The rotation of motor 42 is transmitted by gearing from plate 44 of the pneumatic control to shaft 48', which is adapted to be connected to differential 30 in the same manner as shaft 18 and thereby to introduce the altitude rate set up by motor 42 to effect the corrections to engine speed and indicated air speed hereinbefore described. With our electrical method of setting up rates, an altitude "spot" may be introduced through differential 43 by the rotation of knob 69.

The manner in which the speed and direction of rotation of altitude rate motor 42 are controlled is as follows: Shaft 47 which carries potentiometer 41 also carries a cam 50, which, when rotated in a clockwise direction from its neutral position (Fig. 5) closes a pair of contacts 51, 52 and, when rotated in a counter-clockwise direction closes another pair of contacts 51', 52'. The closing of contact 51 connects one end of motor field winding 58 to the positive side of a D. C. supply line, the other end of the field winding being permanently connected to the negative side of the line, thus energizing the motor field. The closing of contact 52 connects one end of variable resistance 56 through closed contact 51 to the positive side of the line. A path is thereby established from the negative side of the line through variable resistance 55 to one end of potentiometer resistance winding 54, through this winding to its midpoint and thence to said resistance 56 and the positive side of the line. When cam 50 is rotated in a clockwise direction, contact arm 53 of potentiometer 41 is likewise rotated in a clockwise direction. This arm is connected to one brush of motor armature 57, the other brush of said armature being connected to the positive side of the line through contact 52. It will be apparent that for the condition of clockwise rotation of shaft 47, motor armature 57 has applied to it the voltage drop from the positive side of the line to the point of contact of arm 53 with resistance winding 54 and that this drop increases as 53 is rotated away from its central position. Armature 57 rotates at a speed proportional to the voltage across it and in a direction determined by the relation of the polarity of this voltage to the field voltage. The maximum and minimum speeds of armature 57 are adjustable by means of variable resistances 55 and 56, respectively.

When shaft 47 is rotated in a counter-clockwise direction, thereby rotating cam 50 and contact arm 53 in the same direction, contact 51' connects field 58 across the line with the same polarity as before, while contact 52' connects one end of variable resistance 56 to the negative side of the line, thereby establishing a path from the positive side of the line through contact 51', variable resistance 55', potentiometer resistance 54 to its mid point, to said resistance 56 and the negative side of the line. The counter-clockwise rotation of contact arm 53 imposes the voltage drop between its point of contact with potentiometer resistance 54 and the negative side of the line on armature 57, causing it to run in the opposite direction to that due to clockwise rotation of shaft 47. In this case the maximum motor speed is determined by the adjusted value of resistance 55' while the minimum speed is determined by resistance 56, as before.

In the foregoing description of our invention, independently controlled means for causing the airplane to climb or dive and for making the necessary adjustments incident to departure from level flight have been disclosed. We may, however, provide jointly controlled means to perform the above mentioned functions. In carrying out this embodiment of our invention, we provide a three-dimensional cam 59 which is rotated in accordance with the desired angle of climb or glide and is translated in accordance with the indicated true air speed for solving the right-angle triangle shown in Fig. 7. We obtain as a lift of cam pin 60

Vertical rate $V_0$ = true air speed × sin glide angle

This displacement, proportional to the vertical rate of climb or glide, is therefore proportional to the rate of change of altitude. A knob 61 is provided by means of which the indicated true air speed, as read on the air speed meter, is introduced into the cam mechanism. A scale 66 readable on an index 67 is preferably provided on this knob to facilitate the setting. A second knob 62 is provided for setting in the angle of climb or glide. A scale 68 readable on an index 69 is likewise preferably provided on this knob. The rotation of knob 62 is transmitted by gearing to a shaft 63 which connects with the climb control of the automatic pilot and is adapted to displace cut-off plate 12 in the same manner as does shaft 8, thereby causing the craft to climb or glide. Cam pin 60 carries a rack 64 which engages a pinion 65 on $V_0$ shaft 47 of the bomb sight. By this means its lift is changed into a rotation and introduced into the bomb sight computing mechanism in the same manner as any other rotation of the $V_0$ knob. The corrections to the indicated air speed and engine speed are derived from shaft 47 as hereinbefore described.

It will be apparent that the above described arrangement provides a joint control for the climb or glide of the aircraft and for introducing any or all of the corrections which have been provided for and described in connection with other forms of our invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic pilot director for bombsights mounted on aircraft, the combination with a bombsight having means for altering the altitude setting, a variable speed device for controlling said means, means for causing change of altitude of the craft at a rate governed by the speed of said variable speed device, and adjustable means for governing the speed and direction of said device.

2. In an automatic pilot director for bombsights mounted on aircraft, the combination with a bombsight having means for altering the altitude setting to keep the line of sight on the target, a variable speed device for controlling said means, means for causing change of altitude of the craft at a rate governed by the speed of said device, means for controlling the speed and direction of said device, and means for continuously indicating the altitude setting.

3. In an aircraft having an airspeed meter and mounting a bombsight, adjustable means for introducing into the bombsight a rate of change of altitude setting, and means controlled by said first means for automatically correcting the indication of the air speed meter for change of altitude.

4. In an aircraft mounting a bombsight, adjustable means for introducing into the bombsight a rate of change of altitude setting corresponding to a known angle of climb or glide of the craft, and means controlled by said first means for automatically positioning the throttle of the craft's engine in a predetermined manner to maintain a substantially constant air speed during said climb or glide.

5. In an aircraft mounting a bombsight adapted to function during a climb or glide, means for introducing into said bombsight a rate of change of altitude setting corresponding to the climb or glide angle of the craft, means controlled by said first means for automatically correcting the indicator of an air speed meter for change of altitude, and means controlled by said first means for automatically positioning the throttle of the craft's engine in accordance with the angle of climb or glide to maintain a substantially constant air speed.

6. In an aircraft having a plurality of mechanisms including a sighting device affected by change of altitude, a reversible variable speed motor, means for controlling the rotation of said motor as to speed and direction to represent change of altitude, and means operated by said motor for readjusting said several mechanisms.

7. In an aircraft mounting a bombsight, an automatic pilot for controlling the flight of said aircraft, an altimeter, a variable speed device for producing a controllable motion representing change of altitude, means for controlling the output of said variable speed device as to direction and speed, means for causing the craft through the automatic pilot to change altitude at a rate corresponding to the output of said variable speed device comprising a follow-up system for controlling said automatic pilot from said bombsight, said follow-up system having a repeat-back or follow-up connection from said altimeter, and means for introducing the output of said variable speed device into the bombsight as an altitude adjustment during non-level flight.

8. In an automatic pilot director for bombsights mounted on aircraft, the combination with a bombsight of means for producing motion proportional to change of altitude, means for maintaining the line of sight on the target during a climb or glide thereby, and air speed meter and means controllable by said first means for compensating the indication of said meter for change of altitude.

9. In an aircraft carrying a bombsight and controlled by an automatic pilot, remote control means for causing the craft through the automatic pilot to climb or glide at a predetermined angle, means controlled by said first means for introducing rate of change of altitude into said bombsight, and means controlled by said first means for correcting the indication of an air speed meter.

10. In an aircraft mounted bombsight, means for computing rate of change of altitude comprising a three-dimensional cam arranged for independent rotation and axial displacement, a cam follower positioned from said cam, a device for measuring true air speed, means for imparting one of said displacements to said cam in proportion to measured true airspeed, means indicating glide angle of the craft, and means for imparting the other of said displacements to said cam in proportion to glide angle, the contour of said cam being such that the lift at each point represents rate of change of altitude ($V_0$) corresponding to the settings of true airspeed and glide angle, as computed from the equation:

$$V_0 = \text{true air speed} \times \sin \text{glide angle}$$

11. In an aircraft mounted bombsight, means for computing rate of change of altitude comprising a three-dimensional cam arranged for independent rotation and axial displacement, a cam follower positioned from said cam, a device for measuring true air speed, means for imparting one of said displacements to said cam in proportion to measured true airspeed, means indicating glide angle of the craft, and means for imparting the other of said displacements to said cam in proportion to glide angle, the contour of said cam being such that the lift at each point represents rate of change of altitude ($V_0$) corresponding to the settings of true airspeed and glide angle, as computed from the equation:

$$V_0 = \text{true air speed} \times \sin \text{glide angle}$$

and means actuated by said cam follower for controlling the speed of the craft's engine.

12. Apparatus for use on airplanes controlled by an automatic pilot and mounting a bombsight having altitude setting means comprising, means for producing a displacement variable in proportion to desired change of altitude of the craft, means actuated by said displacement causing the automatic pilot to effect said altitude change, and means actuated by said displacement for altering the altitude setting of the bombsight in proportion thereto.

CARL A. FRISCHE.
GERALD N. HANSON.